(12) United States Patent
Koike et al.

(10) Patent No.: US 11,708,928 B2
(45) Date of Patent: Jul. 25, 2023

(54) RESIN JOINT, CHANNEL BLOCK, AND FLUID CONTROL DEVICE

(71) Applicant: NIPPON PILLAR PACKING CO., LTD., Osaka (JP)

(72) Inventors: Tomoyuki Koike, Osaka (JP); Hiroki Sakamoto, Osaka (JP); Shingo Higuchi, Osaka (JP); Kiyotaka Ohmae, Osaka (JP); Tomohiro Adachi, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 17/791,499

(22) PCT Filed: Oct. 13, 2020

(86) PCT No.: PCT/JP2020/038657
§ 371 (c)(1),
(2) Date: Jul. 7, 2022

(87) PCT Pub. No.: WO2021/152927
PCT Pub. Date: Aug. 5, 2021

(65) Prior Publication Data
US 2023/0045298 A1 Feb. 9, 2023

(30) Foreign Application Priority Data
Jan. 28, 2020 (JP) .................................. 2020-011463

(51) Int. Cl.
*F16L 47/04* (2006.01)
*F16L 43/00* (2006.01)

(52) U.S. Cl.
CPC ............ *F16L 47/041* (2019.08); *F16L 43/008* (2013.01)

(58) Field of Classification Search
CPC ........ F16L 47/04; F16L 47/041; F16L 19/041; F16L 19/028; F16L 19/0283; F16L 43/008; F16L 33/223; F16L 41/001
See application file for complete search history.

(56) References Cited

U.S. PATENT DOCUMENTS

| 5,553,900 | A | 9/1996 | Fukumoto et al. |
| 2006/0157975 | A1* | 7/2006 | Fujii ..................... F16L 47/041 |

(Continued)

FOREIGN PATENT DOCUMENTS

| CN | 202418699 U | * 9/2012 | ............... F16K 5/06 |
| CN | 202418699 U | 9/2012 | |

(Continued)

*Primary Examiner* — Zachary T Dragicevich
(74) *Attorney, Agent, or Firm* — Maschoff Brennan (57) ABSTRACT

A resin joint includes a joint body having a flow path, sleeves, and union nuts that fix tubes to the joint body. The joint body has a body portion with a curved inner peripheral surface and a straight portion protruding from an end portion of the body portion. The straight portion has outer and inner cylindrical portions radially arranged inside the outer cylindrical portion. An end portion of the inner cylindrical portion is positioned closer to the body portion than is an end portion of the outer cylindrical portion. A groove portion extending parallel with the outer and inner cylindrical portions in an axial direction is formed between an inner peripheral surface of the outer cylindrical portion and an outer peripheral surface of the inner cylindrical portion. The tube is fixed to the joint body such that a press-fit portion of the sleeve is press-fitted in the groove portion.

7 Claims, 12 Drawing Sheets

(56) References Cited

U.S. PATENT DOCUMENTS

| | | | |
|---|---|---|---|
| 2007/0007764 A1* | 1/2007 | Simmons | F16L 47/041 |
| 2013/0118623 A1* | 5/2013 | Nguyen | F16L 47/041 |
| 2016/0215912 A1 | 7/2016 | Fujii et al. | |
| 2019/0193315 A1 | 6/2019 | Miyamoto et al. | |

FOREIGN PATENT DOCUMENTS

| | | | | |
|---|---|---|---|---|
| CN | 203286088 A | | 11/2013 | |
| CN | 203286088 U | * | 11/2013 | F16K 27/06 |
| CN | 105556190 A | | 5/2016 | |
| EP | 2187106 A1 | | 5/2010 | |
| JP | H04-248095 A | | 9/1992 | |
| JP | H04248095 A | * | 9/1992 | F16L 15/00 |
| JP | 2011-208659 A | | 10/2011 | |
| JP | 2015-068500 A | | 4/2015 | |
| JP | 2015068500 A | * | 4/2015 | F16L 19/005 |
| JP | 2019-010857 A | | 1/2019 | |
| JP | 2019010857 A | * | 1/2019 | B29C 45/26 |
| WO | 2009/025136 A1 | | 2/2009 | |
| WO | WO-2009025136 A1 | * | 2/2009 | F16L 19/041 |
| WO | 2018/025519 A1 | | 2/2018 | |
| WO | WO-2018025519 A1 | * | 2/2018 | B29C 45/00 |

\* cited by examiner

RESIN JOINT, CHANNEL BLOCK, AND FLUID CONTROL DEVICE

TECHNICAL FIELD

The present invention relates to a resin joint, a channel block, and a fluid control device.

BACKGROUND ART

A resin joint is one example of a component that connects tubes used as a flow path in, e.g., a semiconductor manufacturing device or a pharmaceutical product manufacturing device.

As miniaturization of, e.g., the semiconductor manufacturing device progresses, the degree of integration of components provided in the device increases. Thus, for compactly connecting the tubes to each other, an elbow-shaped resin joint is utilized.

Figure 15:
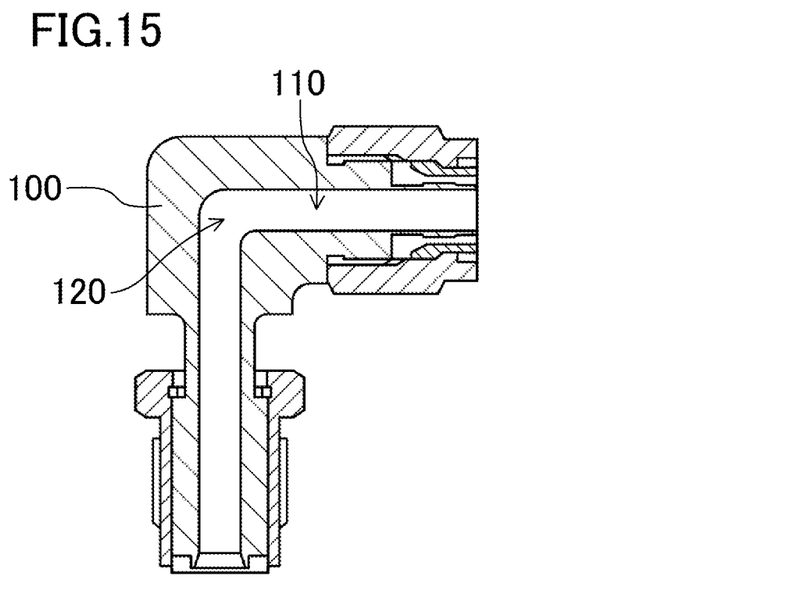
FIG. 15 is a sectional view showing the structure of a typical elbow-shaped resin joint.
Figure 16:
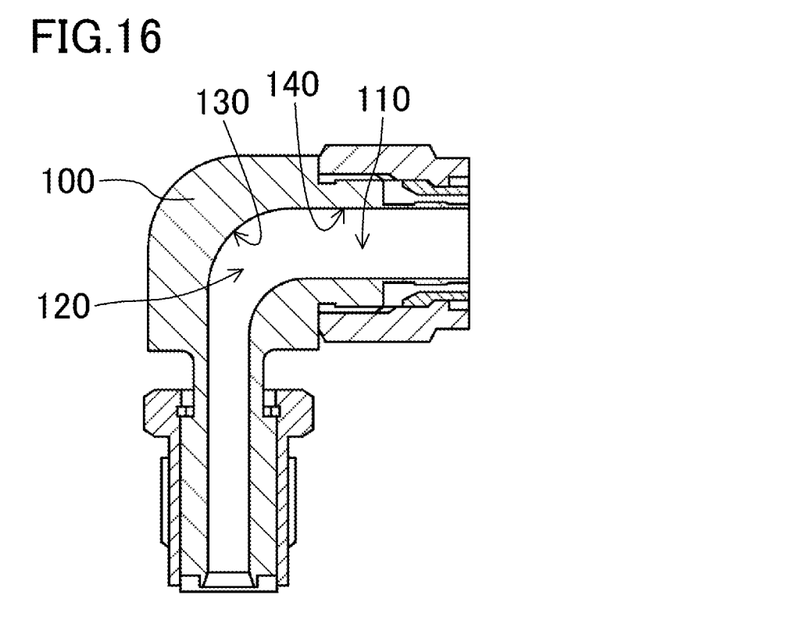
FIG. 16 is a sectional view showing the structure of the typical elbow-shaped resin joint.

Patent Document 1 discloses, as shown in FIG. 15, an elbow-shaped resin joint 100 having such a structure that a flow path 110 formed inside is bent at substantially right angle at a corner portion 120. However, fluid flowing in the flow path 100 having such a structure forms a turbulence due to collision with an inner wall of the corner portion 120, resulting in a pressure loss. Thus, the flow path at the corner portion 120 is formed in a curved shape with a great curvature radius as shown in FIG. 16 so that the flow of fluid in the flow path 110 can be smooth and the pressure loss can be reduced accordingly.

CITATION LIST

Patent Document

Patent Document 1: Japanese Unexamined Patent Publication No. 2011-208659

SUMMARY OF THE INVENTION

Technical Problem

In a case where the resin joint 100 formed with the flow path is formed by injection molding, the resin joint 100 is typically formed by the following method. First, a core pin having a shape corresponding to the shape of the flow path is arranged in a cavity of a mold, and in this state, molten resin is injected into the cavity. After the injected resin has been solidified, the core pin is pulled out. In this manner, the resin joint 100 is formed.

However, in the resin joint 100 having the structure as shown in FIG. 16, an inner peripheral surface forming the flow path includes a section 130 curved at the corner portion 120 and sections 140 formed straight on end portion sides. Thus, the core pin to be arranged in the cavity of the mold also includes, at an outer peripheral surface thereof, a section curved corresponding to the shape of the corner portion 120 of the joint 100 and straight sections corresponding to the shapes on the end portion sides.

Against this background, assume that the curvature radius of the curved section of the core pin is large. When the core pin is pulled out, the curved section of the core pin is caught by an inner peripheral surface at the section 140, which is formed straight on the end portion side, of the joint 100, which makes it impossible to pull out the core pin. Even if the curvature radius is small, there is also a problem that the inner peripheral surface of the section 140, which is formed straight on the end portion side, of the resin joint 100 is damaged when the core pin is forcibly pulled out.

The present disclosure has been made in view of the above-described points, and it is a main object of the present disclosure to provide a resin joint having a curved flow path and having a less pressure loss.

Solution to the Problem

The resin joint of the present disclosure includes a resin joint body having a flow path, a sleeve having a press-fit portion that is press-fittable in the joint body and a coupling portion that is press-fittable in a tube, and a union nut to be attached to the outer periphery of the joint body to fix the tube, in which the coupling portion is fitted, to the joint body.

The joint body has a body portion with a curved inner peripheral surface and a straight portion protruding from an end portion of the body portion. The straight portion has an outer cylindrical portion and an inner cylindrical portion arranged inside the outer cylindrical portion in a radial direction, the outer cylindrical portion and the inner cylindrical portion having a common shaft. An end portion of the inner cylindrical portion in an axial direction is positioned closer to the body portion than an end portion of the outer cylindrical portion in the axial direction is to the body portion. A groove portion extending parallel with the outer cylindrical portion and the inner cylindrical portion in the axial direction is formed between an inner peripheral surface of the outer cylindrical portion and an outer peripheral surface of the inner cylindrical portion. The tube is fixed to the joint body in a state in which the press-fit portion of the sleeve is press-fitted in the groove portion.

Advantages of the Disclosure

According to the present disclosure, the resin joint having the curved flow path and having the less pressure loss can be provided.

DESCRIPTION OF EMBODIMENTS

Hereinafter, embodiments of the present invention will be described in detail with reference to the drawings. Note that the present invention is not limited to the following embodiments. In addition, changes can be made as necessary without departing from a scope in which the effects of the present invention are obtained.

First Embodiment

Figure 1:
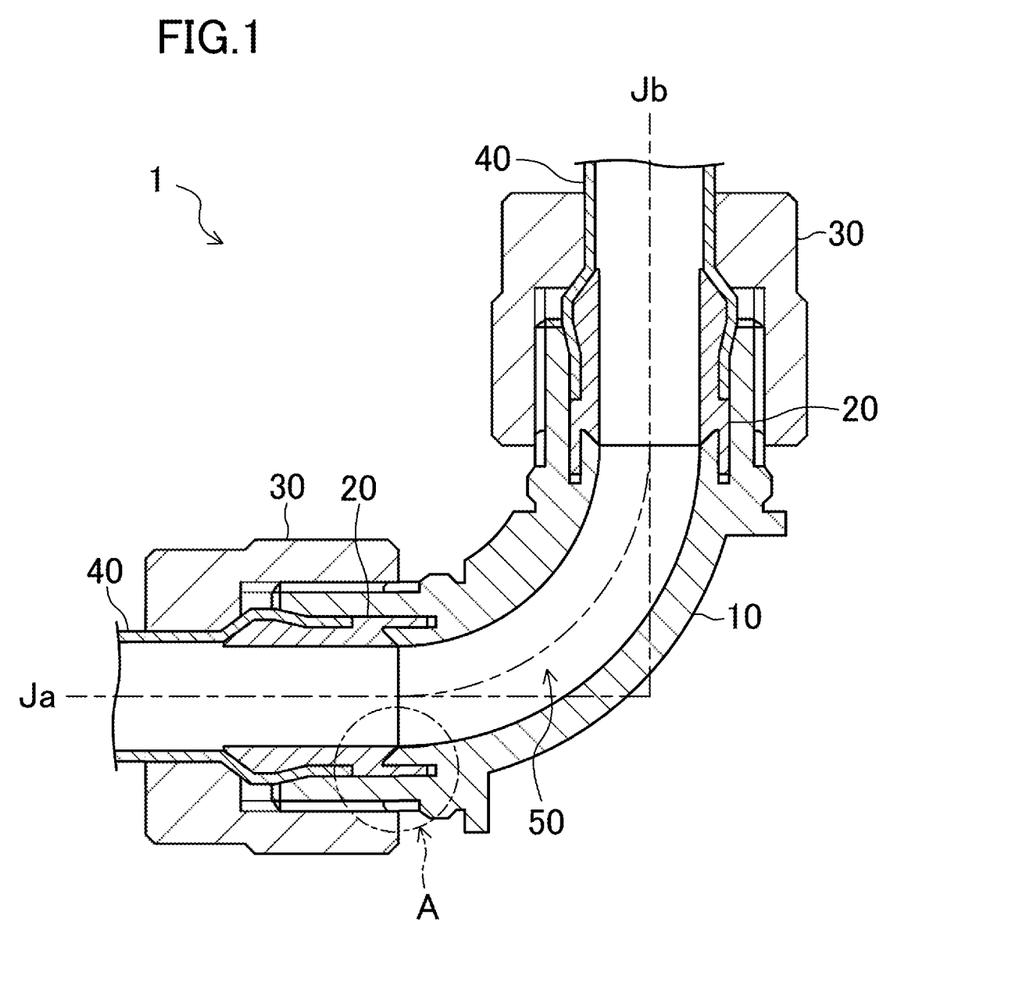
FIG. 1 is a sectional view schematically showing the configuration of a resin joint of a first embodiment of the present invention.

FIG. 1 is a sectional view schematically showing the configuration of a resin joint (hereinafter also simply referred to as a "joint") in a first embodiment of the present invention. Note that FIG. 1 shows a state in which tubes are connected to the joint.

As shown in FIG. 1, the joint 1 of the present embodiment includes a joint body 10 having a curved flow path 50, sleeves 20 that can be press-fitted in the joint body 10, and union nuts 30 that are attached to the outer periphery of the joint body 10 to fix the tubes 40 to the joint body 10.

The joint body 10 is formed of resin by injection molding. In the present embodiment, examples of the resin may include fluorine resin such as tetrafluoroethylene-perfluoroalkylvinylether copolymer (PFA), polyvinylidene fluoride (PVDF), and tetrafluoroethylene-ethylene copolymer (ETFE). The sleeve 20 and the union nut 30 may also be formed using fluorine resin such as PFA, PVDF, ETFE, or polytetrafluoroethylene (PTFE). Note that the resin is not limited to fluorine resin; For example, polyethylene, polypropylene, polycarbonate, polyamide, polyacetal, polyether ether ketone, polyphenylene sulfide, or polyimide may be used and the resin is changeable as necessary according to, e.g., the field of use, application, or the material of the tube 40.

Figure 2:
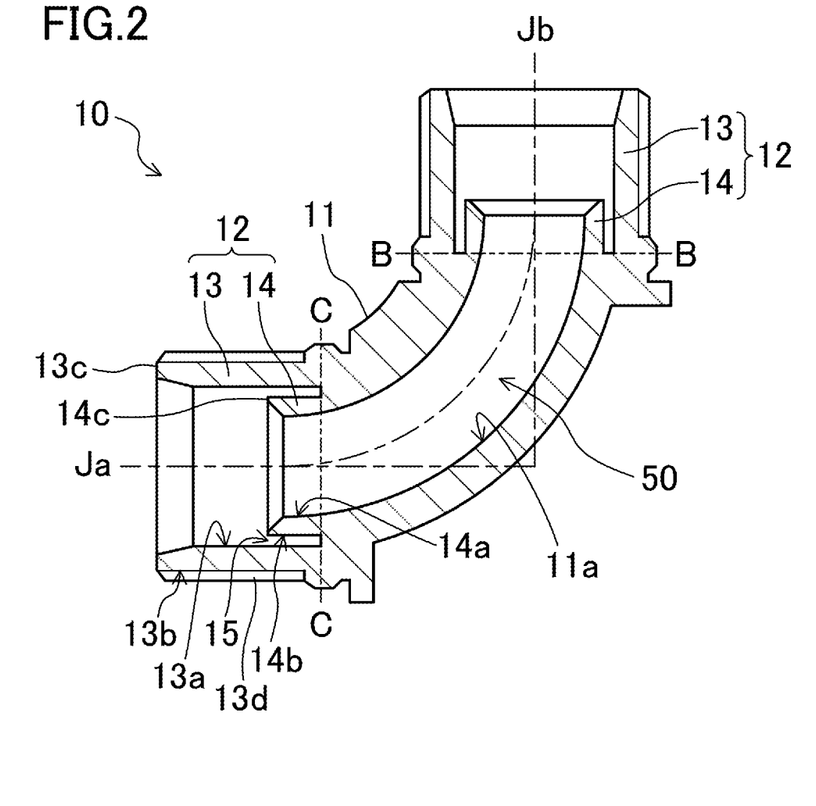
FIG. 2 is a sectional view schematically showing the configuration of a joint body.

FIG. 2 is a sectional view schematically showing the configuration of the joint body 10.

As shown in FIG. 2, the joint body 10 includes a body portion 11 having a curved inner peripheral surface and straight portions 12 protruding from end portions B-B, C-C of the body portion 11. The flow path 50 is formed inside the body portion 11. Note that in the present embodiment, the configurations of both end portions to which the tubes 40 are to be connected are the same as each other in the joint body 10, and therefore, only the configuration of one end portion will be described.

The straight portion 12 includes an outer cylindrical portion 13 and an inner cylindrical portion 14 having a common shaft Ja. The inner cylindrical portion 14 is arranged inside the outer cylindrical portion 13 in a radial direction. An end portion 14c of the inner cylindrical portion 14 in a shaft Ja direction is positioned closer to the body portion 11 than an end portion 13c of the outer cylindrical portion 13 in the shaft Ja direction is to the body portion 11 (in other words, the end portion 13c in the shaft Ja direction protrudes father out from the end portion B-B, C-C than the end portion 14c in the shaft Ja direction). A groove portion 15 extending parallel with the shaft Ja direction of the outer cylindrical portion 13 and the inner cylindrical portion 14 is formed between an inner peripheral surface 13a of the outer cylindrical portion 13 and an outer peripheral surface 14b of the inner cylindrical portion 14. The groove portion 15 is formed into an annular shape, and is surrounded by the body portion 11, the outer cylindrical portion 13, and the inner cylindrical portion 14. An external thread 13d is formed at an outer peripheral surface 13b of the outer cylindrical portion 13.

Figure 3:
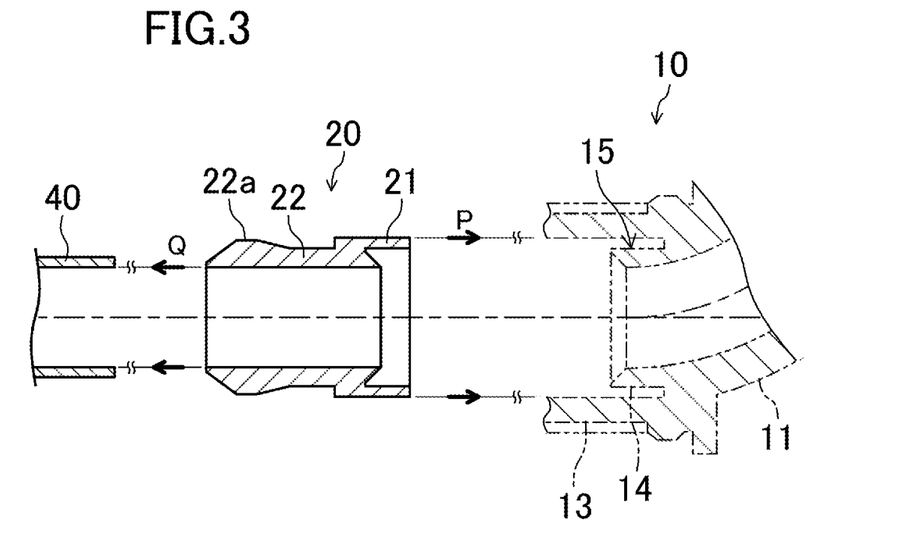
FIG. 3 is a sectional view schematically showing the configuration of a sleeve.

FIG. 3 is a sectional view schematically showing the configuration of the sleeve 20.

As shown in FIG. 3, the sleeve 20 is formed into a tubular shape having the same shaft as the shaft Ja of the outer cylindrical portion 13 and the inner cylindrical portion 14. The sleeve 20 has a press-fit portion 21 that can be press-fitted in the joint body 10 and a coupling portion 22 that can be press-fitted in the tube 40. The press-fit portion 21 is formed into an annular shape, and is press-fitted in the groove portion 15 of the joint body 10 in the direction of arrows P shown in the figure. A protruding portion 22a is formed at an outer peripheral surface of the coupling portion 22. When the coupling portion 22 is press-fitted in the tube 40 in the direction of arrows Q shown in the figure, the inner diameter of the tube 40 is expanded by the protruding portion 22a.

Figure 4:
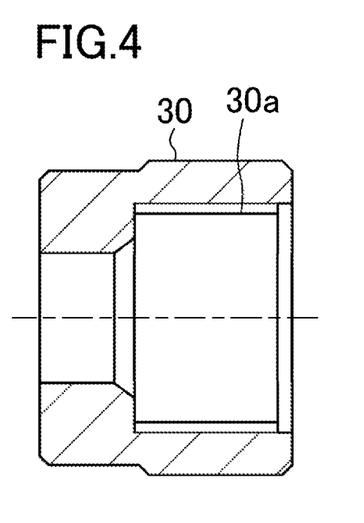
FIG. 4 is a sectional view schematically showing the configuration of a union nut.

FIG. 4 is a sectional view schematically showing the configuration of the union nut 30.

As shown in FIG. 4, the union nut 30 is formed into a tubular shape having the same shaft as the shaft Ja of the outer cylindrical portion 13 and the inner cylindrical portion 14. An internal thread 30a that engages with the external thread 13d formed at the outer peripheral surface 13b of the outer cylindrical portion 13 is formed at an inner peripheral surface of the union nut 30.

As shown in FIG. 1, the steps of connecting the tube 40 to the joint 1 are as follows.

First, as shown in FIG. 3, the sleeve 20 is press-fitted in the tube 40. At this time, the inner diameter of the tube 40 is expanded by the protruding portion 22a. Next, the press-fit portion 21 of the sleeve 20 press-fitted in the tube 40 is press-fitted in the groove portion 15 of the joint body 10. In this state, the internal thread 30a of the union nut 30 engages with the external thread 13d of the outer cylindrical portion 13, and in this manner, the tube 40 is connected to the joint 1.

Figure 5:
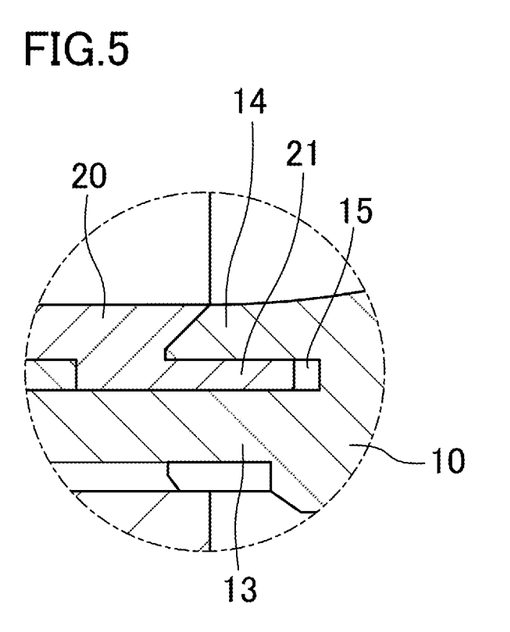
FIG. 5 is an enlarged sectional view of a portion indicated by an arrow A in FIG. 1.

FIG. 5 is an enlarged sectional view of a portion indicated by an arrow A in FIG. 1.

As shown in FIG. 5, the press-fit portion 21 of the sleeve 20 is press-fitted in the groove portion 15 of the joint body 10, and accordingly, outer and inner peripheral surfaces of the press-fit portion 21 respectively pressure-contact the inner peripheral surface of the outer cylindrical portion 13 and the outer peripheral surface of the inner cylindrical portion 14. In this way, the outward and inward pressing force of the press-fit portion 21 in the radial direction is utilized so that the fluid sealability of fluid flowing in the flow path 50 can be improved. Thus, it is not necessary to firmly fasten the union nut 30 in the shaft Ja direction. Consequently, sufficient sealability can be ensured only by manually fastening the union nut 30.

Next, the method for forming the joint body 10 of the present embodiment by injection molding will be described with reference to FIG. 6.

In a case where the joint body 10 including the flow path 50 is formed by injection molding, molten resin is injected into a cavity of a mold in a state in which a core pin formed into a shape corresponding to the shape of the flow path 50 is arranged in the cavity. After the injected resin has been solidified, the core pin is pulled out. In this manner, the joint body 10 is formed.

Figure 6:
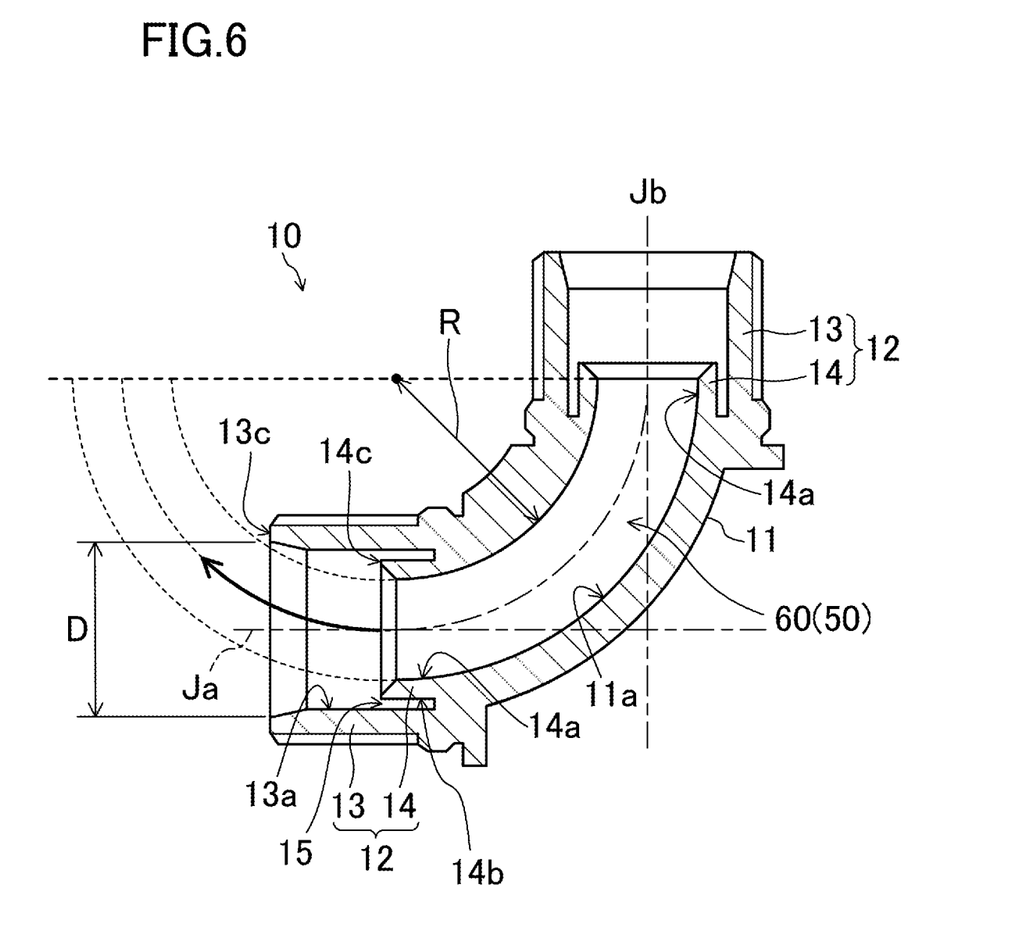
FIG. 6 is a view for describing the method for forming the joint body by injection molding.

As shown in FIG. 6, the inner peripheral surface 11a of the body portion 11 and an inner peripheral surface 14a of the inner cylindrical portion 14 of the straight portion 12 in the joint body 10 form the flow path 50 of the joint body 10. Further, the inner peripheral surface 11a of the body portion 11 and the inner peripheral surface 14a of the inner cylindrical portion 14 are set to have the same curvature, and are formed into a curved shape. Thus, an outer peripheral surface of the core pin 60 arranged in the cavity of the mold (not shown) is also formed, corresponding to the shape of the flow path 50, into a curved shape with the same curvature. That is, the outer peripheral surface of the core pin 60 has no straight region.

Accordingly, the core pin 60 arranged in the cavity can be, as shown in FIG. 6, pulled out while being rotated in the direction of an arrow shown in the figure after the molten resin injected into the cavity has been solidified.

Note that the end portion 13c of the outer cylindrical portion 13 in the shaft Ja direction protrudes farther outward of the body portion 11 than the end portion 14c of the inner cylindrical portion 14 in the shaft Ja direction. Thus, in one preferred embodiment, the inner diameter D of the outer cylindrical portion 13 and the curvature radius R of the outer peripheral surface of the core pin 60 on a center-of-curvature side are set such that the core pin 60 does not contact the outer cylindrical portion 13 when the core pin 60 is pulled out.

As described above, the joint 1 of the present embodiment is configured such that the press-fit portion 21 of the sleeve 20 is press-fitted in the groove portion 15 of the joint body 10, thereby improving the fluid sealability. To ensure such sealability, the press-fit portion 21 and the groove portion 15 are parallel with the shaft Ja direction or a shaft Jb direction in one preferred embodiment. Thus, the inner peripheral surface 13a of the outer cylindrical portion 13 and the outer peripheral surface 14b of the inner cylindrical portion 14 defining the groove portion 15 are in a straight shape parallel with the shaft Ja direction or the shaft Jb direction in one preferred embodiment.

On the other hand, in the present embodiment, the inner peripheral surface 14a of the inner cylindrical portion 14 is in the curved shape. However, the length of the inner cylindrical portion 14 in the shaft Ja direction or the shaft Jb direction can be shortened to such an extent that the sealability can be ensured. Thus, even if the inner peripheral surface 14a is in the curved shape, the inner cylindrical portion 14 with the straight outer peripheral surface 14b can be formed.

As described above, according to the joint 1 in the present embodiment, a joint including a curved flow path can be easily formed by injection molding while the fluid sealability is ensured. Accordingly, it is possible to provide the joint 1 with excellent fluid sealability and less fluid pressure loss.

Figure 7:
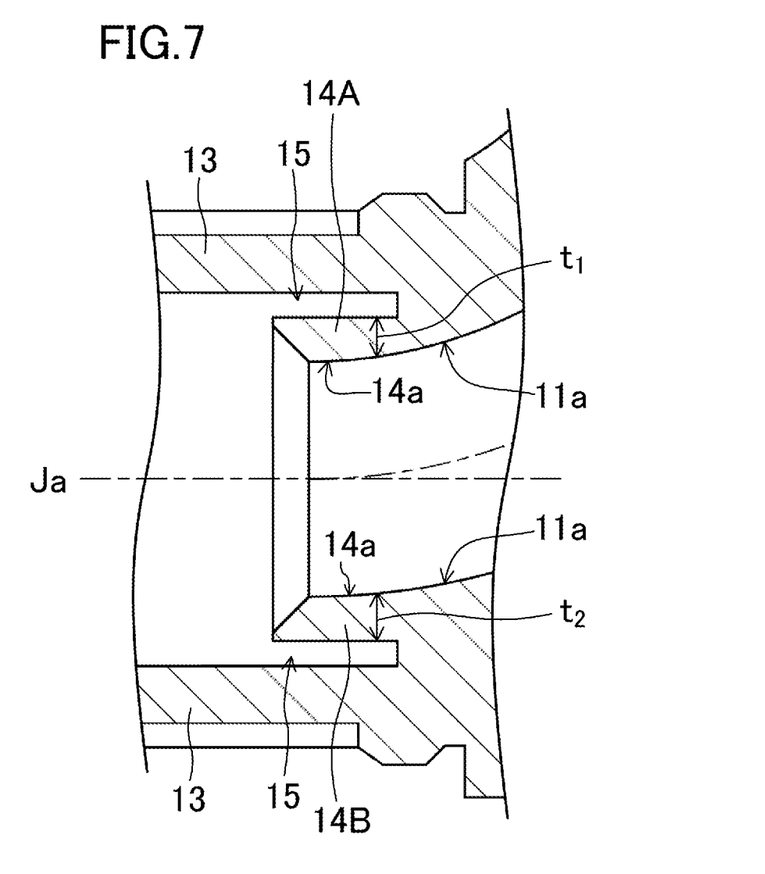
FIG. 7 is an enlarged view of the vicinity of a groove portion of the joint body.

Since the inner peripheral surface 14a of the inner cylindrical portion 14 is in the curved shape, the thickness $t_1$ of an inner cylindrical portion 14A, which is positioned on the side closer to the center of curvature, in the radial direction gradually decreases along the shaft Ja direction as shown in an enlarged view of FIG. 7. On the other hand, the thickness $t_2$ of an inner cylindrical portion 14B, which is positioned opposite to the side closer to the center of curvature, in the radial direction gradually increases along the shaft Ja direction. That is, the thickness of the inner cylindrical portion 14 in the radial direction is non-uniform in a circumferential direction. Thus, the sealability provided by press-fitting the press-fit portion 21 of the sleeve 20 in the groove portion 15 may disadvantageously vary in the circumferential direction. However, such variation can be reduced by increasing the thickness of the inner cylindrical portion 14 in the radial direction.

Figure 8:
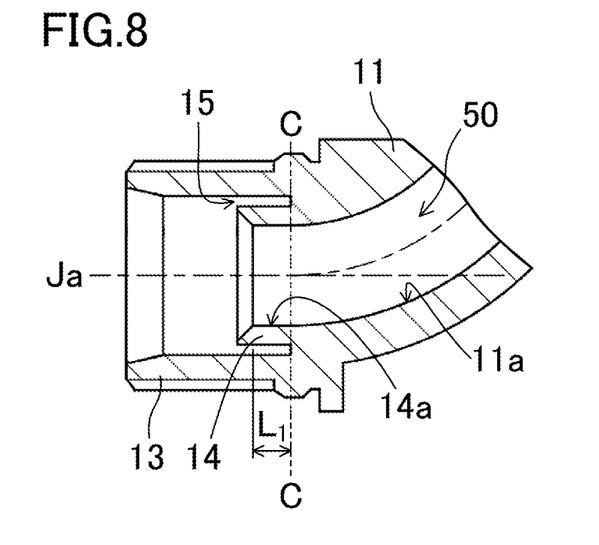
FIG. 8 is a sectional view showing another configuration for reducing variation in sealability.

FIG. 8 is a sectional view showing another configuration for reducing variation in the sealability.

As shown in FIG. 8, the inner peripheral surface 14a of the inner cylindrical portion 14 extends in parallel with the shaft Ja direction of the inner cylindrical portion 14. That is, the inner peripheral surface 14a of the inner cylindrical portion 14 extends straight until the end portion C-C of the body portion 11. Thus, the thickness of the inner cylindrical portion 14 in the radial direction is uniform in the circumferential direction. As a result, variation in the sealability provided by press-fitting the press-fit portion 21 of the sleeve 20 in the groove portion 15 can be reduced.

Note that the length $L_1$ of the inner peripheral surface 14a of the inner cylindrical portion 14 is short as described above so that the core pin 60 can be pulled out while being rotated. Even if the core pin 60 is forcibly pulled out, almost no significant influence on the flow of fluid in the flow path 50 is found because damage of the inner peripheral surface 14a of the inner cylindrical portion 14 is extremely small.

Figure 9:
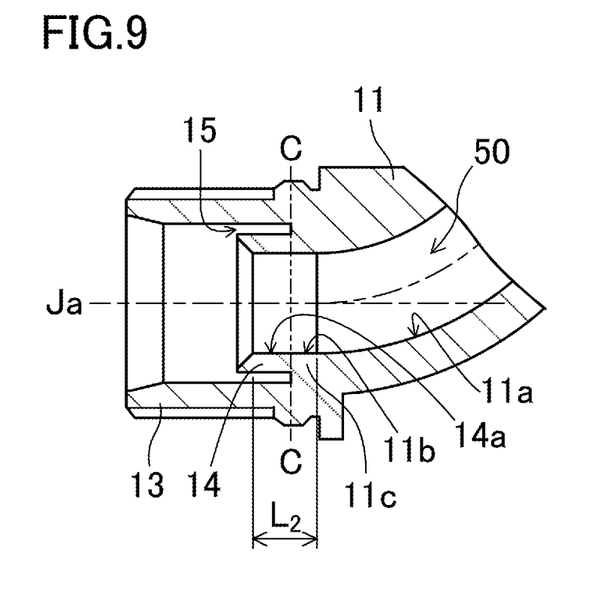
FIG. 9 is a sectional view showing still another configuration for reducing variation in the sealability.

FIG. 9 is a sectional view showing another configuration for reducing variation in the sealability.

As shown in FIG. 9, the body portion 11 of the joint body 10 has, on an end portion C-C side of the body portion 11, an extension portion 11c configured such that the inner peripheral surface 11b of the body portion 11 extends continuously with the inner peripheral surface 14a of the inner cylindrical portion 14 that extends in parallel with the shaft Ja direction of the inner cylindrical portion 14. That is, as compared to the configurations shown in, e.g., FIGS. 2 and 8, the straight region of the inner peripheral surface 14a of the inner cylindrical portion 14 further extends to part of the inner peripheral surface 11b of the body portion 11. With this configuration, the thickness of the inner cylindrical portion 14 in the radial direction can be uniform in the circumferential direction. As a result, variation in the sealability provided by press-fitting the press-fit portion 21 of the sleeve 20 in the groove portion 15 can be further reduced.

Note the following: If the length of the extension portion 11c is increased more than needed, it is difficult to pull out the core pin 60 while the core pin 60 is rotating. Thus, the length $L_2$ of the straight region including the inner peripheral surface 14a of the inner cylindrical portion 14 and the inner peripheral surface 11b of the extension portion 11c is preferably equal to or less than ⅓ of the curvature radius R of the body portion 11 and more preferably equal to or less than ⅕. Note the following: As shown in FIG. 6, the curvature radius R of the body portion 11 means the curvature radius of the inner peripheral surface 11a of the body portion 11 on the center-of-curvature side.

Second Embodiment

Figure 10:
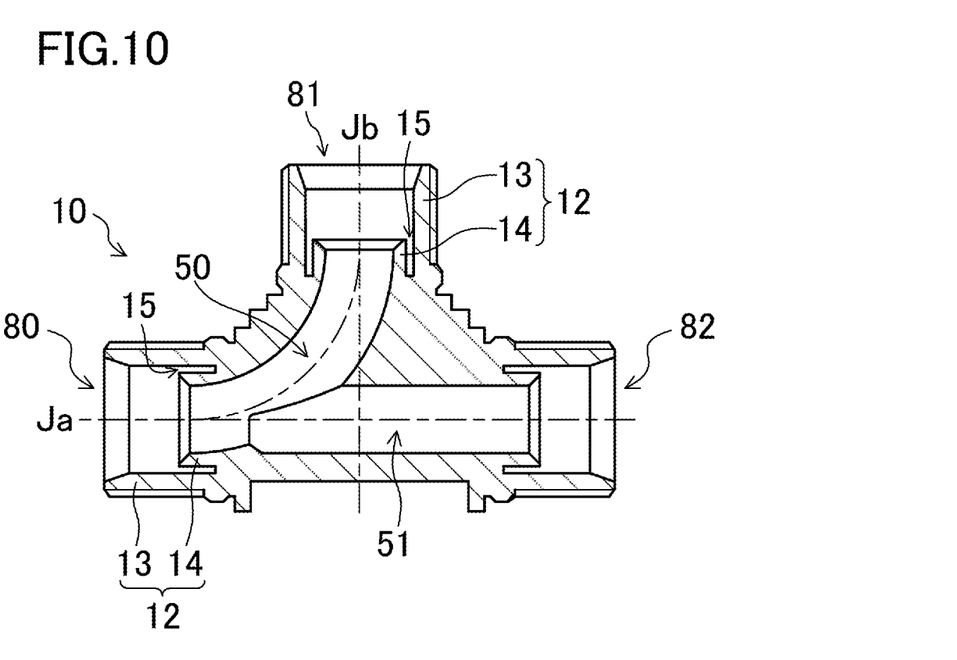
FIG. 10 is a sectional view schematically showing the configuration of a resin joint of a second embodiment of the present invention.

FIG. 10 is a sectional view schematically showing the configuration of a resin joint in a second embodiment of the present invention. Note that this figure only shows a joint body 10 while a sleeve 20 and a union nut 30 are omitted.

The first embodiment has described the so-called elbow-shaped joint configured such that the joint body 10 has the curved flow path as shown in FIG. 1, but the present embodiment is different from the form of FIG. 1 in that the present embodiment will describe a so-called T-shaped joint.

As shown in FIG. 10, the joint body 10 has three opening ends 80, 81, 82, and tubes are each connected to the opening ends 80, 81, 82. A flow path 50 formed between the opening ends 80, 81 is in a curved shape, and a flow path 51 formed between the opening ends 80, 82 is in a straight shape. In the present embodiment, the same structure as that of the joint body 10 shown in FIG. 1 is employed for a section formed with the curved flow path 50.

That is, the joint body 10 has, at each of the opening ends 80, 81 of the section formed with the curved flow path 50, a straight portion 12 including an outer cylindrical portion 13 and an inner cylindrical portion 14, and a groove portion 15 is formed between an inner peripheral surface of the outer cylindrical portion 13 and an outer peripheral surface of the inner cylindrical portion 14.

Third Embodiment

Figure 11A:
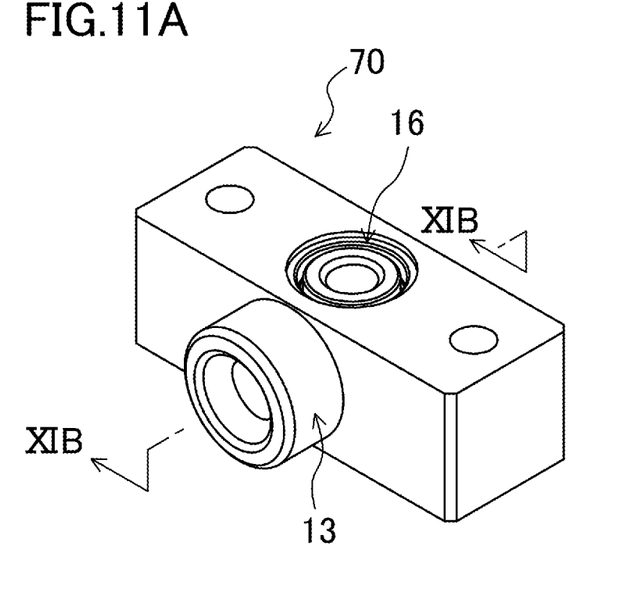
FIGS. 11A and 11B are views schematically showing the configuration of a channel block in a third embodiment of the present invention, FIG. 11A being a perspective view, FIG. 11B being a sectional view taken along XIB-XIB line in FIG. 11A.
Figure 11B:
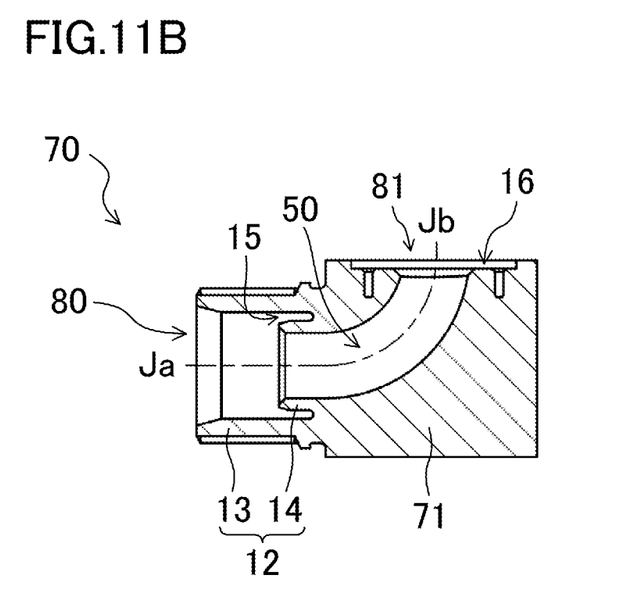

FIGS. 11A and 11B are views schematically showing the configuration of a channel block 70 in a third embodiment of the present invention, FIG. 11A being a perspective view, FIG. 11B being a sectional view taken along XIB-XIB line in FIG. 11A.

As shown in FIG. 11B, the channel block 70 in the present embodiment includes a resin block body, and has a body portion 71 configured such that an inner peripheral surface thereof forms a curved flow path 50.

The channel block 70 has opening ends 80, 81, and the same structure as that of the joint body 10 shown in FIG. 1 is employed for one opening end 80. That is, the channel block 70 has, at one opening end 80, a straight portion 12 protruding from one end portion of the body portion 71. The straight portion 12 has an outer cylindrical portion 13 and an inner cylindrical portion 14 arranged inside the outer cylindrical portion 13 in a radial direction, the outer cylindrical portion 13 and the inner cylindrical portion 14 having a common shaft Ja. An end portion of the inner cylindrical portion 14 in an axial direction is positioned closer to the body portion 71 than an end portion of the outer cylindrical portion 13 in the axial direction is to the body portion 71. In addition, a groove portion 15 extending parallel with the outer cylindrical portion 13 and the inner cylindrical portion 14 in the axial direction is formed between an inner peripheral surface of the outer cylindrical portion 13 and an outer peripheral surface of the inner cylindrical portion 14.

On the other hand, an annular seal groove 16 in which a gasket is to be press-fitted is formed at the outer end portion (the opening end 81) of the body portion 71. The shape of the seal groove 16 is not particularly limited, and may be determined as necessary according to the shape of the gasket to be press-fitted.

In a case where a tube is connected to the channel block 70 at one opening end 80, the same structure as that of the sleeve 20 and the union nut 30 shown in FIG. 1 can be employed. That is, the sleeve 20 has a press-fit portion 21 that can be press-fitted in the block body and a coupling portion that can be press-fitted in the tube, and the press-fit portion 21 is press-fitted in the groove portion 15 of the block body in a state in which the coupling portion is press-fitted in the tube. In this state, the union nut 30 is attached to the outer periphery of the block body, and in this manner, the tube is connected to the channel block 70.

Next, an example of use of the channel block 70 in the present embodiment will be described with reference to FIGS. 12A and 12B.

Figure 12A:
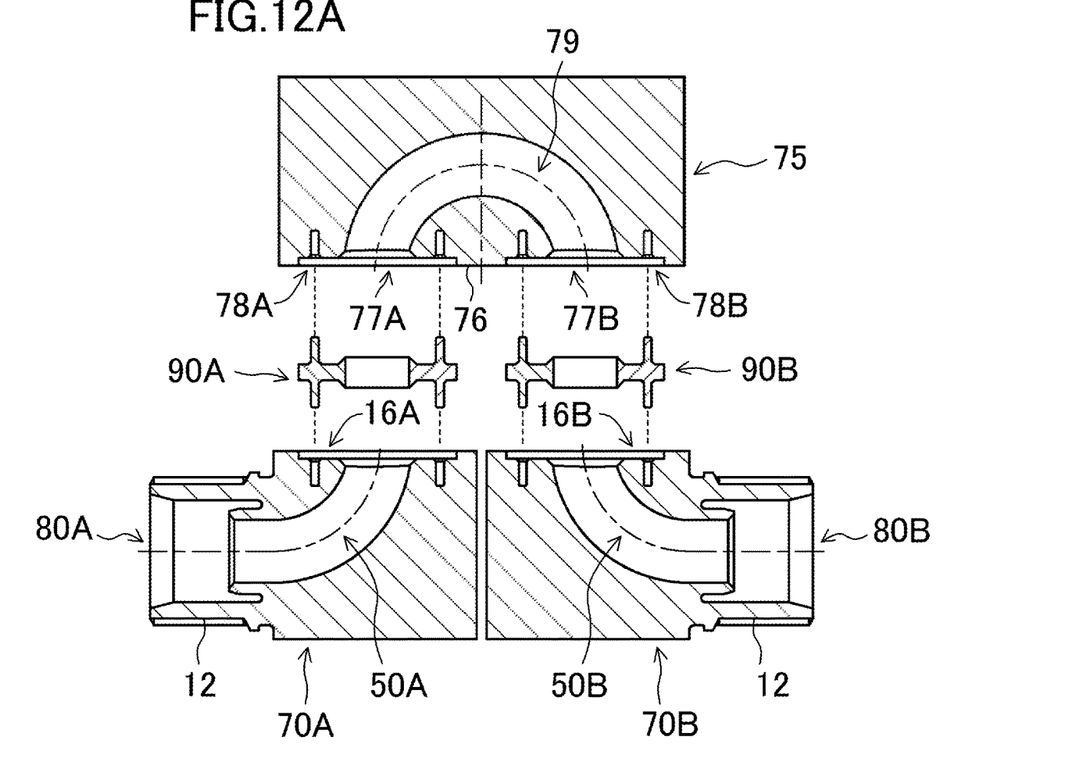
FIGS. 12A and 12B are views showing an example where the channel block and a U-shaped block are combined to form a joint.
Figure 12B:
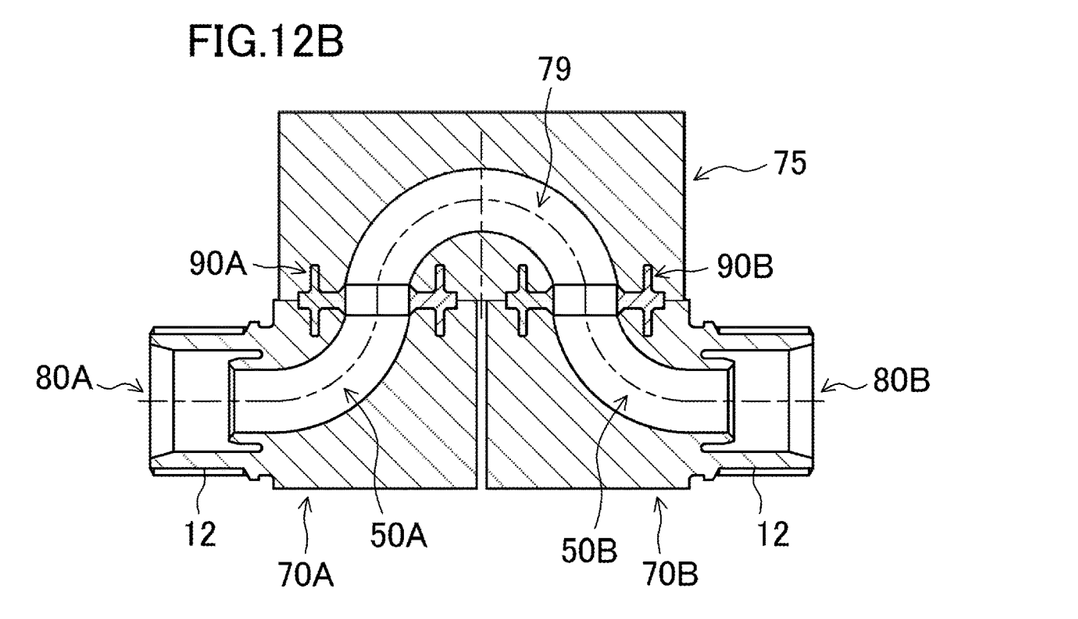

FIGS. 12A and 12B are views showing an example where the channel block 70 in the present embodiment and a U-shaped block 75 are combined to form a joint.

As shown in FIG. 12A, the U-shaped block 75 has an opening end 77A and an opening end 77B at the same surface 76, and a flow path 79 formed between the opening ends 77A, 77B is in a curved U-shape. In addition, annular seal grooves 78A, 78B in which gaskets are to be press-fitted are each formed at the opening ends 77A, 77B. The U-shaped block 75 is, for example, made of a resin material.

First, as shown in FIG. 12A, two channel blocks 70A, 70B are arranged such that opening ends 80A, 80B are positioned on the opposite sides and seal grooves 16A, 16B are arranged on the same plane. In addition, the U-shaped block 75 is arranged at such a position that the seal grooves 78A, 78B respectively face the seal grooves 16A, 16B of the channel blocks 70A, 70B. Further, annular gaskets 90A, 90B are arranged respectively corresponding to the positions of the seal grooves 16A, 16B of the channel blocks 70A, 70B and the positions of the seal grooves 78A, 78B of the U-shaped block 75.

Then, as shown in FIG. 12B, the gaskets 90A, 90B are press-fitted respectively in the seal grooves 16A, 16B of the channel blocks 70A, 70B and the seal grooves 78A, 78B of the U-shaped block 75 so that the channel blocks 70A, 70B and the U-shaped block 75 are assembled with each other. In this manner, a joint having a flow path formed by connecting a flow path 50A of the channel block 70A, the flow path 79 of the U-shaped block 75, and a flow path 50B of the channel block 70B to each other is formed.

Figure 13A:
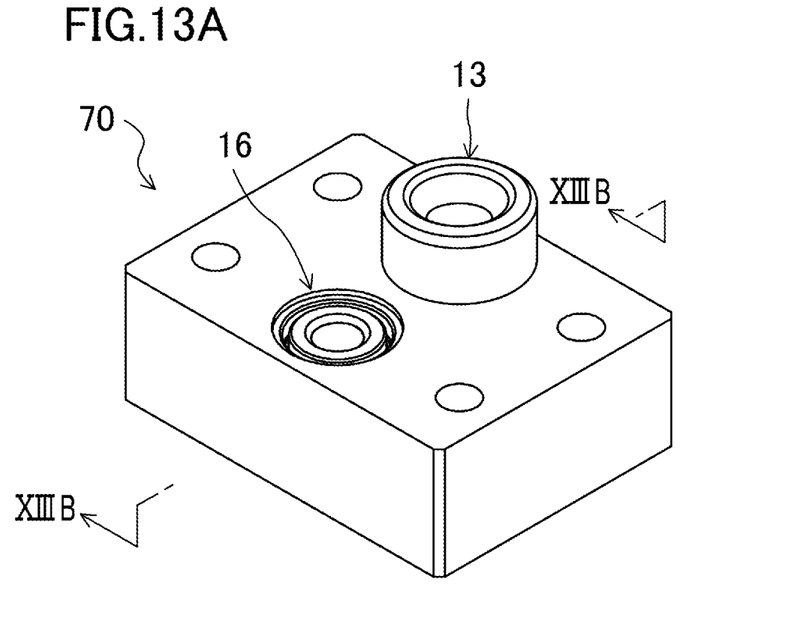
FIGS. 13A and 13B are views schematically showing another configuration of a channel block of a third embodiment of the present invention, FIG. 13A being a perspective view, FIG. 13B being a sectional view taken along XIIIB-XIIIB line in FIG. 13A.
Figure 13B:
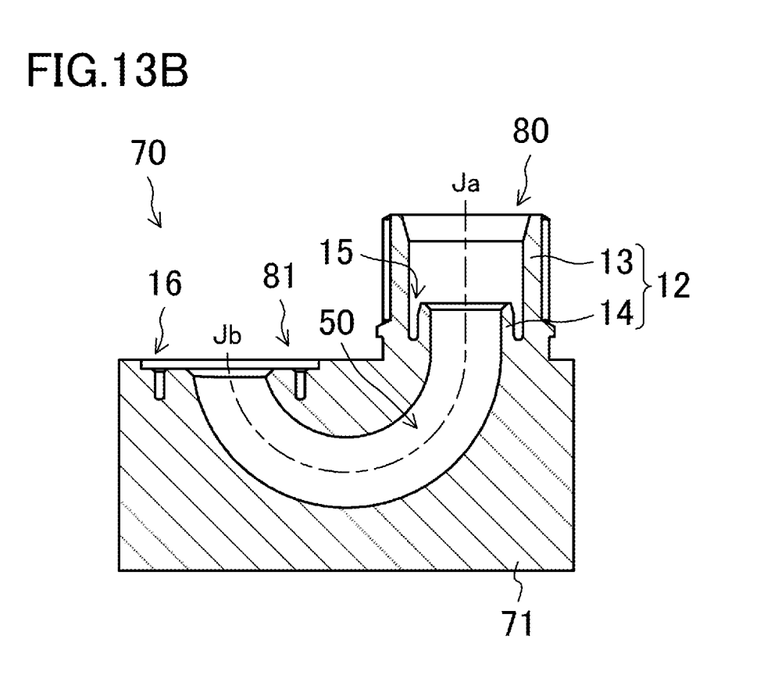

FIGS. 13A and 13B are views schematically showing another configuration of the channel block 70 in the present embodiment, FIG. 13A being a perspective view, FIG. 13B being a sectional view taken along XIIIB-XIIIB line in FIG. 13A.

In the channel block 70 shown in FIG. 11B, the flow path 50 is in an elbow shape, but may be in a U-shape as shown in FIG. 13B.

That is, the channel block 70 has the opening ends 80, 81, and at one opening end 80, has the straight portion 12 protruding from one end portion of the body portion 71. The straight portion 12 has the outer cylindrical portion 13 and the inner cylindrical portion 14 arranged inside the outer cylindrical portion 13 in the radial direction, the outer cylindrical portion 13 and the inner cylindrical portion 14 having the common shaft Ja. The end portion of the inner cylindrical portion 14 in the axial direction is positioned closer to the body portion 71 than the end portion of the outer cylindrical portion 13 in the axial direction is to the body portion 71. In addition, the groove portion 15 extending parallel with the outer cylindrical portion 13 and the inner cylindrical portion 14 in the axial direction is formed between the inner peripheral surface of the outer cylindrical portion 13 and the outer peripheral surface of the inner cylindrical portion 14. On the other hand, the annular seal groove 16 in which the gasket is to be press-fitted is formed at the outer end portion (the opening end 81) of the body portion 71.

Fourth Embodiment

Figure 14:
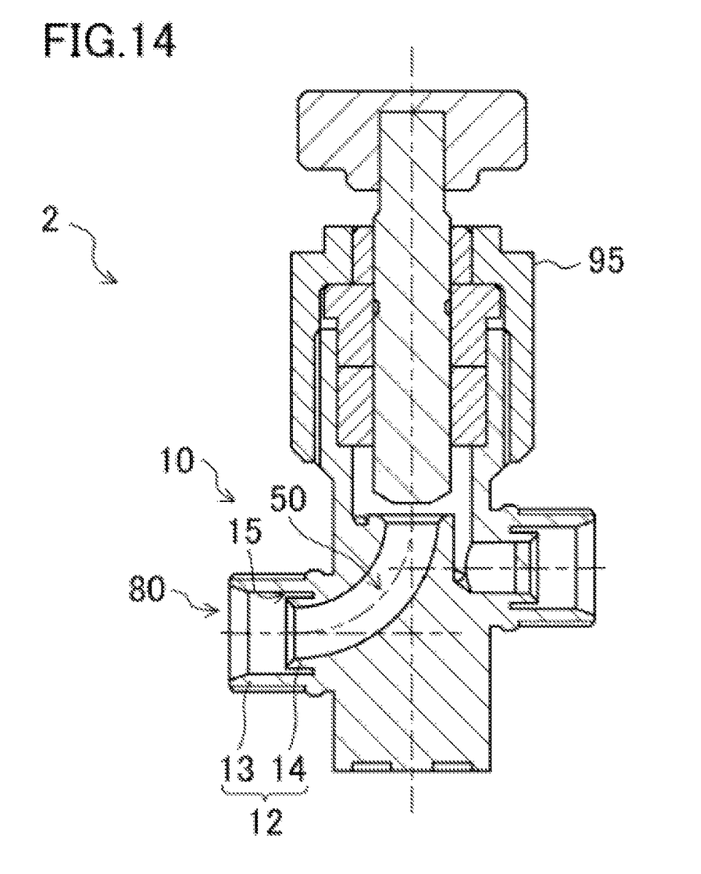
FIG. 14 is a sectional view schematically showing the configuration of a fluid control device of a fourth embodiment of the present invention.

FIG. 14 is a sectional view schematically showing the configuration of a fluid control device 2 of a fourth embodiment of the present invention.

The fluid control device 2 in the present embodiment includes a valve body 95 and a joint 1 formed with a flow path 50 for supplying fluid to the valve body 95. Note that FIG. 14 only shows a joint body 10 while a sleeve 20 and a union nut 30 are omitted.

In the present embodiment, the structure of the joint body 10 shown in FIG. 1 is employed for a section formed with the curved flow path 50.

That is, the joint body 10 has, at an opening end 80 of the section formed with the curved flow path 50, a straight portion 12 including an outer cylindrical portion 13 and an inner cylindrical portion 14, and a groove portion 15 is formed between an inner peripheral surface of the outer cylindrical portion 13 and an outer peripheral surface of the inner cylindrical portion 14.

The present invention has been described above with reference to the preferred embodiments, but is not limited to such description. Needless to say, various modifications can be made.

DESCRIPTION OF REFERENCE CHARACTERS

1 Resin Joint
10 Joint Body
11 Body Portion
11a, 11b Inner Peripheral Surface
12 Straight Portion
13 Outer Cylindrical Portion
13a Inner Peripheral Surface
13b Outer Peripheral Surface
14 Inner Cylindrical Portion
14a Inner Peripheral Surface
14b Outer Peripheral Surface
15 Groove Portion
16 Seal Groove
20 Sleeve
21 Press-Fit Portion
22 Coupling Portion
30 Union Nut
40 Tube
50 Flow Path
60 Core Pin
70 Channel Block
71 Body Portion
75 U-Shaped Block
78A, 78B Seal Groove
79 Flow Path
90A, 90B Gasket
95 Valve Body

The invention claimed is:

1. A resin joint comprising:
a resin joint body having a flow path;
a sleeve having a press-fit portion that is press-fittable in the joint body and a coupling portion that is press-fittable in a tube; and
a union nut to be attached to an outer periphery of the joint body to fix the tube, in which the coupling portion is press-fitted, to the joint body, wherein:
the joint body has a body portion with a curved inner peripheral surface and a straight portion protruding from an end portion of the body portion,
the straight portion has an outer cylindrical portion and an inner cylindrical portion arranged inside the outer cylindrical portion in a radial direction, the outer cylindrical portion and the inner cylindrical portion having a common shaft,
an end portion of the inner cylindrical portion in an axial direction is positioned closer to the body portion than an end portion of the outer cylindrical portion in the axial direction is to the body portion,
an inner peripheral surface of the inner cylindrical portion is curved with a curvature equal to that of an inner peripheral surface of the body portion,
a groove portion extending parallel with the outer cylindrical portion and the inner cylindrical portion in the axial direction is formed between an inner peripheral surface of the outer cylindrical portion and an outer peripheral surface of the inner cylindrical portion, and
the tube is fixed to the joint body in a state in which the press-fit portion of the sleeve is press-fitted in the groove portion.

2. The resin joint of claim 1, wherein the joint body is formed by injection molding.

3. The resin joint of claim 1, wherein the end portion of the outer cylindrical portion in a shaft direction on a center-of-curvature side of the body portion is located inside a circle whose center is the center-of-curvature of the body portion and whose radius is a curvature radius of the inner peripheral surface on the center-of-curvature side of the body portion.

4. The resin joint of claim 1, wherein the flow path is formed by the inner peripheral surface of the body portion and the inner peripheral surface of the inner cylindrical portion, and
the length of the inner peripheral surface on a center-of-curvature side of the flow path is ¼ of the circumference of a circle whose radius is the curvature radius of the inner peripheral surface on the center-of-curvature side of the flow path.

5. A fluid control device comprising:
a valve body; and
a joint formed with the flow path for supplying fluid to the valve body, wherein:
the joint includes the resin joint of claim 1.

6. A fluid control device comprising:
a valve body; and
a joint formed with the flow path for supplying fluid to the valve body, wherein:
the joint includes the resin joint of claim 2.

7. A channel block comprising:
a resin block body having a flow path;
a sleeve having a press-fit portion that is press-fittable in the block body and a coupling portion that is press-fittable in a tube; and
a union nut to be attached to an outer periphery of the block body to fix the tube, in which the coupling portion is press-fitted, to the block body, wherein:
the block body has a body portion with a curved inner peripheral surface and a straight portion protruding from one end portion of the body portion,
the straight portion has an outer cylindrical portion and an inner cylindrical portion arranged inside the outer cylindrical portion in a radial direction, the outer cylindrical portion and the inner cylindrical portion having a common shaft,
an end portion of the inner cylindrical portion in an axial direction is positioned closer to the body portion than an end portion of the outer cylindrical portion in the axial direction is to the body portion, an inner peripheral surface of the inner cylindrical portion is curved with a curvature equal to that of an inner peripheral surface of the body portion, a groove portion extending parallel with the outer cylindrical portion and the inner cylindrical portion in the axial direction is formed between an inner peripheral surface of the outer cylindrical portion and an outer peripheral surface of the inner cylindrical portion, and the tube is fixed to the block body in a state in which the press-fit portion of the sleeve is press-fitted in the groove portion.

\* \* \* \* \*